(12) United States Patent
Zhang

(10) Patent No.: US 12,221,295 B2
(45) Date of Patent: Feb. 11, 2025

(54) PALLET ASSEMBLY AND SORTING ROBOT

(71) Applicant: Beijing Jingdong Qianshi Technology Co., Ltd., Beijing (CN)

(72) Inventor: Jinhu Zhang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 323 days.

(21) Appl. No.: 17/786,460

(22) PCT Filed: Feb. 24, 2021

(86) PCT No.: PCT/CN2021/077709
§ 371 (c)(1),
(2) Date: Jun. 16, 2022

(87) PCT Pub. No.: WO2021/190228
PCT Pub. Date: Sep. 30, 2021

(65) Prior Publication Data
US 2023/0048868 A1    Feb. 16, 2023

(30) Foreign Application Priority Data

Mar. 25, 2020    (CN) .......................... 202010219538.7

(51) Int. Cl.
| | | |
|---|---|---|
| *B65G 47/96* | (2006.01) | |
| *B60P 1/04* | (2006.01) | |
| *B07C 3/02* | (2006.01) | |
| *B60P 1/16* | (2006.01) | |

(52) U.S. Cl.
CPC .............. *B65G 47/962* (2013.01); *B60P 1/04* (2013.01); *B65G 47/965* (2013.01); *B07C 3/02* (2013.01); *B60P 1/165* (2013.01)

(58) Field of Classification Search
CPC ..... B07C 3/02; B07C 5/36; B60P 1/04; B60P 1/165; B65G 47/962; B65G 47/965
USPC ........................................................... 414/470
See application file for complete search history.

(56) References Cited

U.S. PATENT DOCUMENTS

| | | | | |
|---|---|---|---|---|
| 2,969,137 | A | * 1/1961 | Baumann | ............. B65G 47/965 198/793 |
| 3,848,728 | A | * 11/1974 | Leibrick | ................ B65G 17/38 198/833 |
| 4,993,535 | A | 2/1991 | Scata | |

(Continued)

FOREIGN PATENT DOCUMENTS

| | | |
|---|---|---|
| CN | 2000-511147 A | 8/2000 |
| CN | 2020-510523 A | 4/2009 |

(Continued)

OTHER PUBLICATIONS

Search Report from related European Patent Application No. 21774756.7 dated Mar. 19, 2024.

(Continued)

*Primary Examiner* — James Keenan
(74) *Attorney, Agent, or Firm* — McCarter & English, LLP

(57) ABSTRACT

A pallet assembly includes a flap assembly including a first flap and a second flap. The flap assembly has a first state in which the first flap and the second flap are coplanar so as to form a carrying surface for carrying goods, and a second state in which any one of the first flap and the second flap is turned so as to make the goods slide off.

16 Claims, 7 Drawing Sheets

(56) References Cited

U.S. PATENT DOCUMENTS

| | | | | |
|---|---|---|---|---|
| 5,388,681 | A | * | 2/1995 | Bonnet .................. B65G 47/34 |
| | | | | 198/477.1 |
| 6,460,681 | B1 | * | 10/2002 | Coutant ............... B65G 47/965 |
| | | | | 209/912 |
| 11,008,182 | B2 | * | 5/2021 | Tang .................... B65G 47/962 |
| 11,780,686 | B2 | * | 10/2023 | Eisinger ............... B65G 47/967 |
| | | | | 198/370.04 |
| 11,912,514 | B2 | * | 2/2024 | Futch ................... B25J 15/0014 |
| 2020/0038916 | A1 | | 2/2020 | Bombaugh et al. |

FOREIGN PATENT DOCUMENTS

| | | | |
|---|---|---|---|
| CN | 2009-220043 | A | 10/2009 |
| CN | 203582029 | U | 5/2014 |
| CN | 204974494 | U | 1/2016 |
| CN | 106514670 | A | 3/2017 |
| CN | 107225580 | A | 10/2017 |
| CN | 107352208 | A | 11/2017 |
| CN | 207463643 | U | 6/2018 |
| CN | 108636818 | A | 10/2018 |
| CN | 108698768 | A | 10/2018 |
| CN | 208360011 | U | 1/2019 |
| CN | 110102484 | A | 8/2019 |
| CN | 110560374 | A | 12/2019 |
| CN | 209719778 | U | 12/2019 |
| CN | 209753430 | U | 12/2019 |
| CN | 209871668 | A | 12/2019 |
| CN | 110723496 | A | 1/2020 |
| CN | 111729851 | A | 10/2020 |
| DE | 19755474 | C1 | 2/1999 |
| DE | 202018004518 | U1 | 11/2018 |
| EP | 1352858 | A2 | 10/2003 |
| JP | H 08231037 | | 9/1996 |

OTHER PUBLICATIONS

PCT International Search Report dated Apr. 27, 2021, for International Patent Application No. PCT/CN2021/077709.

Chinese First Search Report dated Jul. 28, 2021 for Chinese Application No. 2020102195387.

Chinese First Office Action dated Aug. 3, 2021.

Chinese Supplementary Search Reporting dated Feb. 21, 2022.

Chinese Second Office Action dated Feb. 25, 2022.

Japanese First Office Action dated Jul. 20, 2023 for Japanese Application No. 2022-528561.

\* cited by examiner

PALLET ASSEMBLY AND SORTING ROBOT

CROSS-REFERENCE TO RELATED APPLICATIONS

This patent application is a 35 U.S.C. § 371 National Stage filing of International Application No. PCT/CN2021/077709, filed on Feb. 24, 2021, which application claims priority benefit to Chinese Patent Application No. 202010219538.7, filed on Mar. 25, 2020, the disclosures of which are incorporated herein by reference in their entireties.

TECHNICAL FIELD

The present application relates to the technical field of warehouse logistics, for example, to a pallet assembly, and a sorting robot.

BACKGROUND

With the rapid emerging and continuous development of the warehouse logistics industry, more and more robots are used to replace the manual operation in the warehouse logistics industry, which not only improves the warehouse logistics efficiency and reduces the warehouse logistics cost, but also greatly reduces the labor intensity of relevant workers and greatly improves the intelligence and automation of the warehouse logistics.

Sorting is an important process in the field of the warehouse logistics industry. According to information such as addresses or types of goods attached to the goods or parcels, the goods or parcels are sorted to the relevant compartments or stacks according to the sorting path compiled by the control system so as to achieve the sorting of the goods or parcels. The automated guided vehicle (AGV) is a robot device which achieves the automated sorting of the goods or parcels. The AGV is equipped with an automated guided apparatus, which can travel along the specified guiding path and has various transplanting functions. At present, there are mainly two types of automated guided vehicles: a flap type and a conveyor belt type.

The flap-type automated guided vehicle drives a flap carrying the package to turn over so as to make the package fall into a corresponding compartment. The sorting AGV in the related art is configured to sort small parcels with a relatively light weight. In the sorting process, the flap can only be turned in one direction, that is, the parcels can only fall into the compartment from a fixed side with respect to the running direction of the sorting AGV. When the compartment into which the package needs to fall is on another side of the running direction of the sorting AGV, it is necessary to change the running path of the AGV, as a result, the regulation difficulty is increased and the overall running time of the sorting AGV is increased, thereby reducing the sorting efficiency.

SUMMARY

An embodiment of the present application provides a pallet assembly, so that the pallet assembly is capable of selecting a turning direction of a flap.

An embodiment of the present application also provides a sorting robot, which improves the sorting efficiency of the sorting robot and reduces the regulation difficulty of the sorting robot.

The pallet assembly provided by the embodiment of the present application adopts the following technical solutions:

A pallet assembly is provided. The pallet assembly includes a flap assembly including a first flap and a second flap. The flap assembly has a first state in which the first flap and the second flap are coplanar so as to form a carrying surface for carrying goods, and a second state in which any one of the first flap and the second flap is turned over so as to make the goods slide off.

As an optional solution of the pallet assembly, the pallet assembly further includes a flap driving assembly. The flap driving assembly is configured to selectively drive any one of the first flap and the second flap to turn with respect to the other of the first flap and the second flap.

As an optional solution of the pallet assembly, the pallet assembly further includes a base. When the flap assembly is in the first state, the flap assembly is in parallel with and spaced apart from the base, the flap assembly is located above the base, and the flap driving assembly is disposed between the flap assembly and the base.

As an optional solution of the pallet assembly, the two flaps are a first flap and a second flap respectively. The flap driving assembly includes a drive unit and a transmission unit. The transmission unit includes a transmission shaft, a first transmission rod group and a second transmission rod group.

The transmission shaft is horizontally disposed.

The first transmission rod group is connected to the first flap and the transmission shaft separately; and the second transmission rod group is connected to the second flap and the transmission shaft separately.

The drive unit is configured to drive the transmission shaft to reciprocate horizontally in left-right directions perpendicular to the transmission shaft so as to selectively drive any one of the first transmission rod group and the second transmission rod group to rotate about an axis parallel to the a lengthwise direction of the transmission shaft.

As an optional solution of the pallet assembly, the first transmission rod group is provided with a first elongated hole, the second transmission rod group is provided with a second elongated hole, and the transmission shaft passes through the first elongated hole and the second elongated hole.

When the flap assembly is in the first state, a lengthwise direction of the first elongated hole and the second elongated hole is horizontally disposed and perpendicular to an axis of the transmission shaft, the transmission shaft is located at a first end of the first elongated hole and a first end of the second elongated hole, and a second end of the first elongated hole and a second end of the second elongated hole are respectively located at two sides of the transmission shaft.

As an optional solution of the pallet assembly, the first transmission rod group includes a first support rod and a first connection rod, a first end of the first support rod is connected to the first flap, a second end of the first support rod is hinged to the base, a first end of the first connection rod is provided with the first elongated hole, and a second end of the first connection rod extends in a direction away from the transmission shaft and is hinged to the first support rod.

The second transmission rod group includes a second support rod and a second connection rod, a first end of the second support rod is connected to the second flap, a second end of the second support rod is hinged to the base, a first end of the second connection rod is provided with the second elongated hole, and a second end of the second connection rod extends in a direction away from the first connection rod and is hinged to the second support rod.

As an optional solution of the pallet assembly, the first end of the first elongated hole is located at one end of the first elongated hole close to a connection position of the first connection rod and the first support rod, and the first end of the second elongated hole is located at one end of the second elongated hole close to a connection position of the second connection rod and the second support rod.

As an optional solution of the pallet assembly, the first support rod and the second support rod each includes a first rod portion, a second rod portion and a third rod portion which are connected in sequence from bottom to top. When the flap assembly is in the first state, the first rod portion is vertically disposed and a lower end of the first rod portion is connected to the base; the third rod portion is horizontally disposed and connected to the first flap corresponding to the third rod portion or the second flap corresponding to the third rod portion; and the second rod portion is obliquely disposed with respect to a horizontal direction and an included angle between the second rod portion and the connection rod corresponding to the second rod portion is an acute angle.

As an optional solution of the pallet assembly, the transmission unit includes at least two first transmission rod groups and at least two second transmission rod groups, the at least two first transmission rod groups and the at least two second transmission rod groups are disposed side by side and spaced apart in a lengthwise direction of the transmission shaft.

As an optional solution of the pallet assembly, the transmission unit includes at least one of: a first connection shaft or a second connection shaft. The first connection shaft is in parallel with and spaced apart from the transmission shaft, one end of the first connection rod away from the transmission shaft is rotationally sleeved on the first connection shaft, and the first connection shaft is vertically connected to the first support rod. The second connection shaft is in parallel with and spaced apart from the transmission shaft, one end of the second connection rod away from the transmission shaft is rotationally sleeved on the second connection shaft, and the second connection shaft is vertically connected to the second support rod.

As an optional solution of the pallet assembly, the pallet assembly further includes a drive motor, a lead screw and a lead nut base.

The drive motor is disposed on the base.

The lead screw is disposed horizontally and is perpendicular to the transmission shaft. A first end of the lead screw is connected to an output shaft of the drive motor, and a second end of the lead screw is rotationally connected to the base.

The lead nut base is sleeved on the lead screw and is capable of moving in a lengthwise direction of the lead screw. The lead nut base is connected to the transmission shaft.

As an optional solution of the pallet assembly, the pallet assembly further includes a connection base. The connection base is provided with a mounting hole and a shaft connection hole, a center line of the mounting hole is perpendicular to a center line of the shaft connection hole, the lead nut base passes through the mounting hole, and the transmission shaft passes through the shaft connection hole.

As an optional solution of the pallet assembly, an upper end face of the connection base is provided with a connection groove, the connection groove penetrates two opposite side walls of the connection base in the lengthwise direction of the lead screw, each of the first connection rod and the second connection rod partially extends into the connection groove, and at least one side surface of each of the first connection rod and the second connection rod abuts against a corresponding groove wall of the connection groove.

As an optional solution of the pallet assembly, the pallet assembly further includes a reset assembly. The reset assembly is disposed to reset the first flap and the second flap to an initial horizontal position after the first flap and the second flap are turned-over.

As an optional solution of the pallet assembly, the first flap and the second flap each includes a frame, and a support plate portion disposed horizontally. The frame encloses a periphery of the support plate portion, and when the flap assembly is in the first state, upper surfaces of support plate portions of the first flap and the second flap are coplanar so as to form the carrying surface.

As an optional solution of the pallet assembly, the support plate portion includes multiple support slats disposed side by side and spaced apart. A slot is formed between adjacent two support slats of the multiple support slats and when the flap assembly is in the first state, a support slat of any one of the first flap and the second flap are inserted in the slot of the other one of the first flap and the second flap.

A sorting robot is provided. The sorting robot includes the pallet assembly as described above.

In the pallet assembly provided by the embodiment of the present application, since the two flaps are provided, when the flap assembly is in the first state, the goods are carried on the carrying surface formed by the two flaps, and the sorting robot provided with the pallet assembly is capable of driving the goods to move to a target compartment. When the goods needs to be moved into the target compartment, the flap driving assembly is selectively caused to drive the flap close to the target compartment to be turned according to the running direction of the sorting robot and the position where the target compartment is located, thereby avoiding the turning operation of the sorting robot when the position of the target compartment does not correspond to the turning direction of the flap, reducing the running path of the sorting robot and improving the sorting efficiency. At the same time, since the two flaps are respectively turned in different directions, that is, the sorting robot can unload the goods to the compartments located at two opposite sides, the flexibility of the path planning for the sorting robot is improved and the regulation difficulty is reduced.

The embodiment of the present application provides the sorting robot, the pallet assembly is adopted, so that the sorting efficiency of the sorting robot is improved and the regulation difficulty of the sorting robot is reduced.

Figure 1:
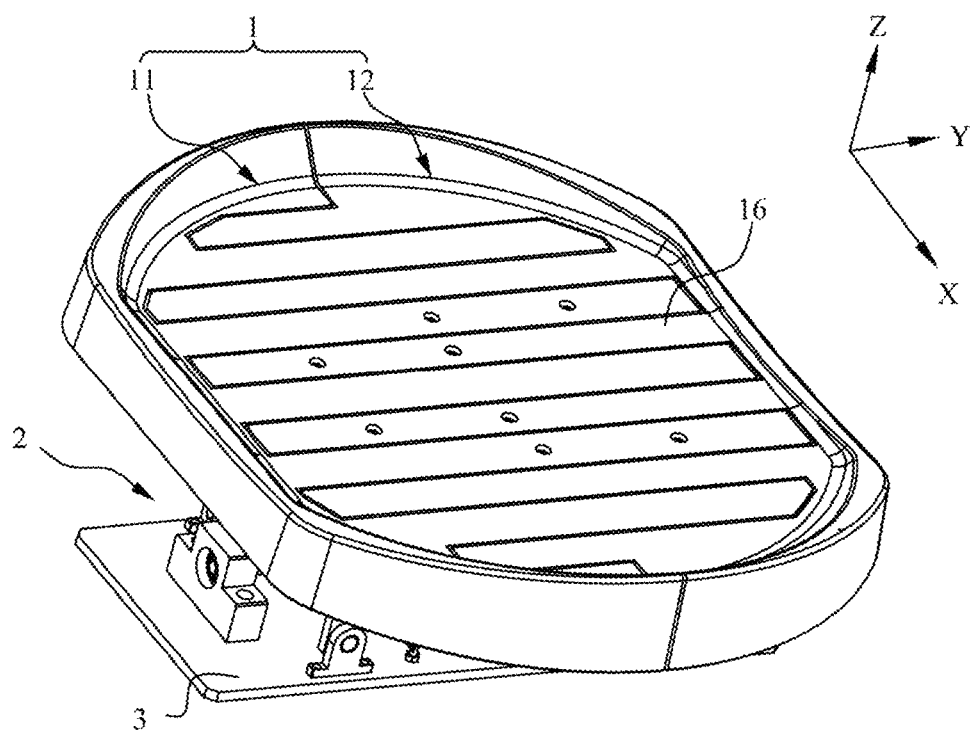
FIG. 1 is a structural diagram of a pallet assembly from a top view when a flap assembly is in a first state according to the embodiment of the present application.

REFERENCE LIST 1 flap assembly
11 first flap
12 second flap
13 support slat
14 frame
141 first segment
142 second segment
143 third segment
144 connection portion
145 top plate portion
146 edge blocking portion
15 slot
16 carrying surface
2 flap driving assembly
21 drive unit
211 drive motor
212 sprocket and chain assembly
2121 driving sprocket
2122 driven sprocket
2123 chain
213 lead screw
214 lead nut base
215 mounting base
216 motor fixing plate
22 transmission unit
221 transmission shaft
222 first transmission rod group
2221 first support rod
22211 first rod portion
22212 second rod portion
22213 third rod portion
2222 first connection rod
22221 first elongated hole
223 second transmission rod group
2231 second support rod
2232 second connection rod
22321 second elongated hole
224 first connection shaft
225 second connection shaft
226 hinge base
227 hinge bush
228 limit plate
229 hinge shaft
23 connection base
231 shaft connection portion
2311 connection groove
232 drive connection portion
24 guide assembly
241 guide shaft
242 fixing base
243 guide bush
244 limit piece
25 tension spring
26 limit sleeve
3 base

DETAILED DESCRIPTION

In the description of the present application, terms "joined", "connected" and "secured" are to be understood in a broad sense unless otherwise expressly specified and limited. For example, the term "connected" may refer to "securely connected", "detachably connected" or "integrated"; may refer to "mechanically connected" or "electrically connected"; or may refer to "connected directly", "connected indirectly through an intermediary"; or may be "connected inside two components" or "interaction relations between two components". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the present application, it should be noted that the orientations or position relations indicated by terms such as "above", "below", "right" and the like are based on orientations or position relations shown in the drawings. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. In addition, the terms "first" and "second" are used only to distinguish between descriptions and have no special meaning.

An embodiment of the present application provides a sorting robot, which is mainly applied to a sorting system of a warehouse logistics system. The sorting robot is configured to perform a sorting operation based on the destination of express parcels and deliver the express parcels to a compartment corresponding to the destination of the express parcel. Understandably, the sorting can be not only for express parcels, but also for other goods to be sorted, and the sorting can be not only based on the destination, but also based on other parameters, such as a goods type and the like.

The sorting robot includes a cart body, a pallet assembly and a control mechanism. The cart body is configured to achieve the automatic movement of the sorting robot. The cart body generally includes a chassis, a shell disposed around the chassis and a driving wheel mechanism. The chassis and the shell are enclosed and forms form an accommodation space. The driving wheel mechanism includes a driving transmission assembly and a driving wheel, The driving transmission assembly is disposed in the accommodation space, the driving wheel is disposed at a lower part of the chassis, and the driving transmission assembly drives the driving wheel to operate so as to achieve the linear movement, turning and reversing of the cart body. The control mechanism is configured to control the operation of the sorting robot. The control mechanism determines a compartment position of a parcel destination according to goods information scanned by a scanning device. The cart body travels, based on a navigation path specified by the control mechanism or the guiding path set in the sorting system, to transport the goods to the position where the target compartment is located. The pallet assembly is configured to carry the goods and turn over the flap to make the goods fall into the target compartment.

It can be understood that reference may be made to the configuration in the related art for the structure of the cart body, the configuration of the control mechanism, and the operation principle and process of the sorting robot, which is not the focus of the present application, and only the configuration of the pallet assembly is described in detail in the present application.

Figure 2:
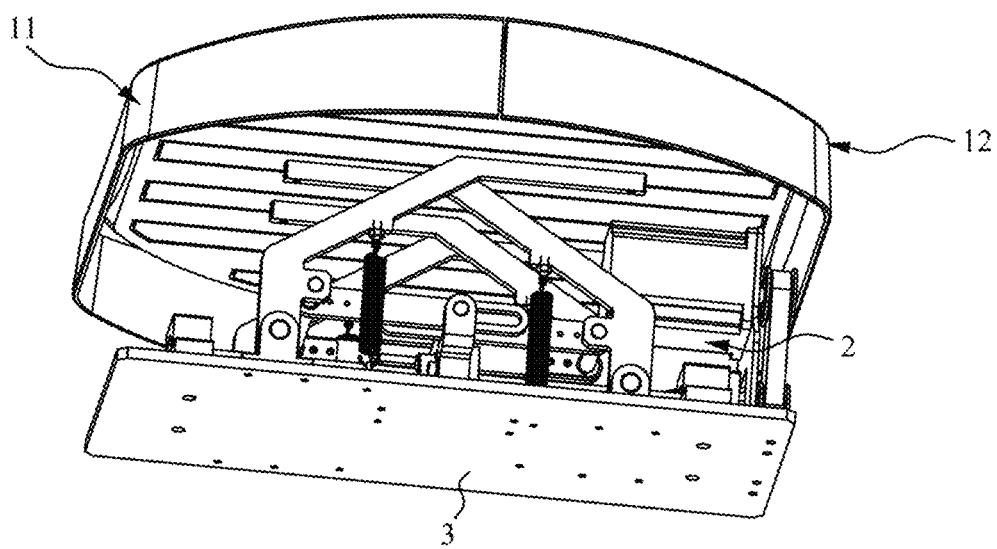
FIG. 2 is a structural diagram of the pallet assembly from a bottom view when the flap assembly is in the first state according to the embodiment of the present application.
Figure 3:
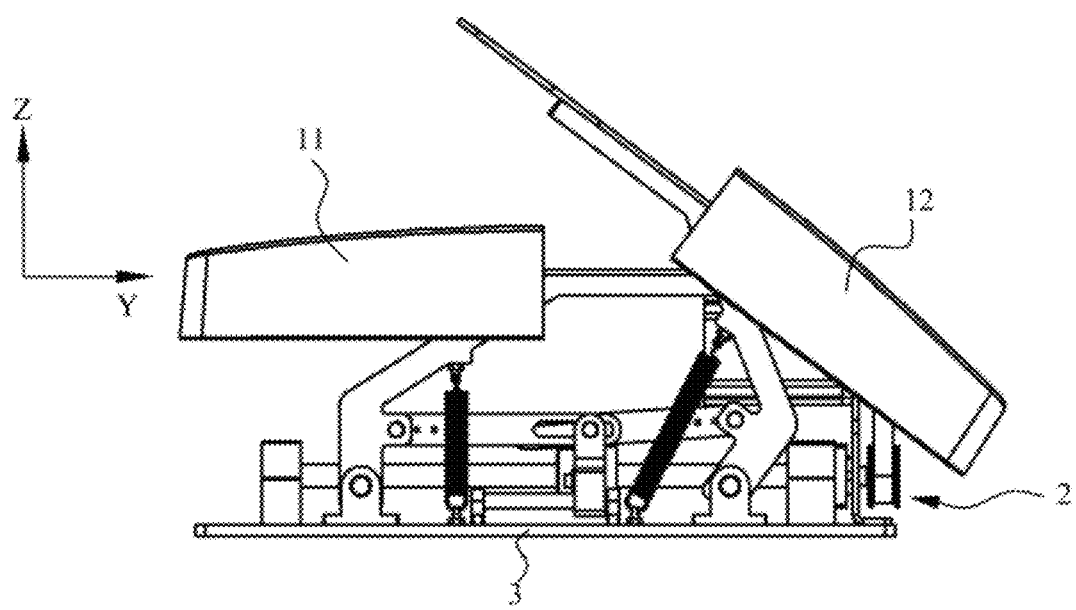
FIG. 3 is a structural diagram of the pallet assembly when the flap assembly is in a second state according to the embodiment of the present application.

FIG. 1 is a structural diagram of a pallet assembly from a top view when a flap assembly is in a first state according to the embodiment of the present application. FIG. 2 is a structural diagram of the pallet assembly from a bottom view when the flap assembly is in the first state according to the embodiment of the present application. FIG. 3 is a structural diagram of the pallet assembly when the flap assembly is in a second state according to the embodiment of the present application. As shown in FIGS. 1 to 3, the pallet assembly provided in the present application includes a flap assembly 1. The flap assembly 1 includes a first flap 11 and a second flap 12. The flap assembly 1 has a first state in which the first flap 11 and the second flap 12 are coplanar so as to form a carrying surface 16 for carrying goods, and a second state in which any one of the first flap 11 and the second flap 12 is turned so as to make the goods slide off.

In the pallet assembly provided by the embodiment of the present application, since the two flaps are provided, when the flap assembly 1 is in the first state, the goods are carried on the carrying surface 16 formed by the two flaps, and the sorting robot is capable of driving the goods to move to the target compartment. When the goods needs to be moved into the target compartment, the flap driving assembly is selectively caused to drive the flap close to the target compartment to be turned according to the running direction of the sorting robot and the position where the target compartment is located, thereby avoiding the turning operation of the sorting robot when the position of the target compartment does not correspond to the turning direction of the flap, reducing the running path of the sorting robot and improving the sorting efficiency. At the same time, since the two flaps are respectively turned in different directions, that is, the sorting robot can unload the goods to the compartments located at two opposite sides, the flexibility of the path planning for the sorting robot is improved and the regulation difficulty is reduced.

Optionally, to drive the first flap 11 and the second flap 12 to turn, the pallet assembly further includes the flap driving assembly 2 connected to the flap assembly 1, and the flap driving assembly 2 selectively drives any one of the first flap 11 and the second flap 12 to turn with respect to the other of the first flap 11 and the second flap 12.

Optionally, to make the pallet assembly be an entirety which can independently assemble and transport, the pallet assembly further includes a base 3. When the flap assembly is in the first state, the flap assembly 1 is in parallel with and spaced apart from the base, the flap assembly 1 is located above the base 3, and the flap driving assembly 2 is disposed between the flap assembly 1 and the base 3.

Exemplarily, the base 3 is a plate-like structure which is horizontally disposed, has a simple structure, is easily configured and has a relatively low manufacturing cost. In other embodiments, the base 3 may also be a structure in other forms, such as a box structure with an upper end opening and the like.

For ease of description, as shown in FIG. 1, in this embodiment, a coordinate system is established by taking a horizontal plane as an XY plane. An XYZ coordinate system is established by taking a direction parallel to a turning axis of the flap as an x direction, taking an upward height direction as a z direction, and determining a y direction by a right-handed rule.

Figure 4:
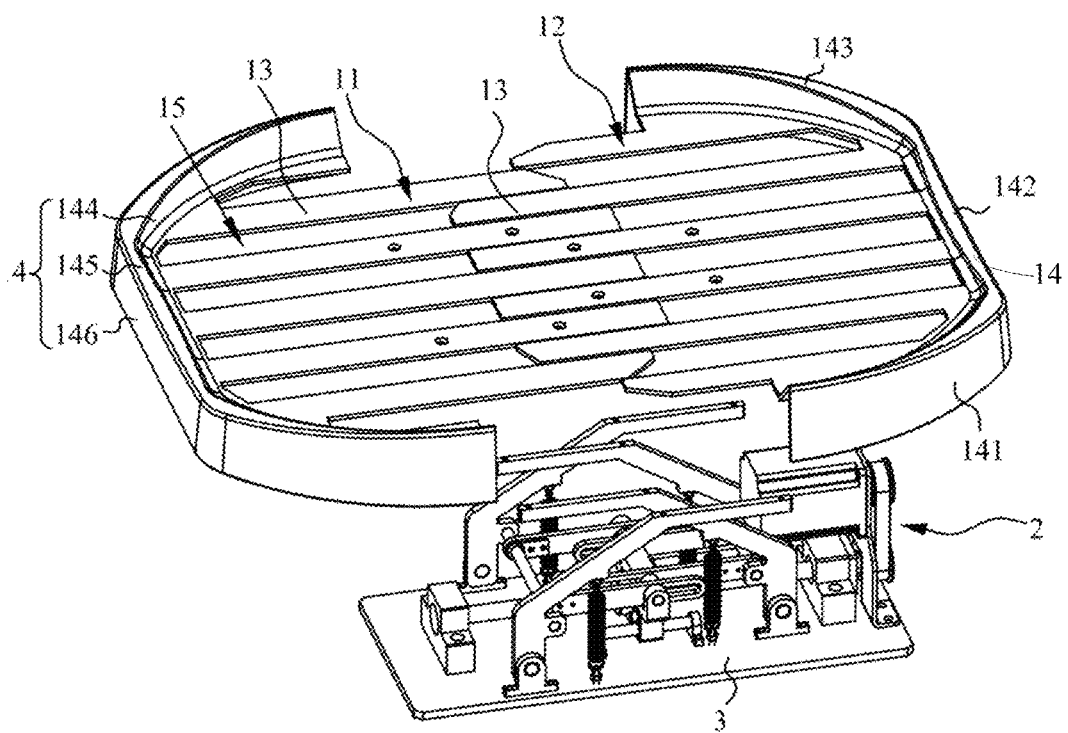
FIG. 4 is an exploded view of the pallet assembly when the flap assembly is in the first state according to the embodiment of the present application.

FIG. 4 is an exploded view of the pallet assembly when the flap assembly is in the first state according to the embodiment of the present application. As shown in FIG. 4, the two flaps are the first flap 11 and the second flap 12 respectively. Optionally, the first flap 11 and the second flap 12 each include a frame 14 and a support plate portion. The support plate portion is disposed horizontally, and when the flap assembly 1 is in the first state, upper surfaces of support plate portions of the two flaps are coplanar so as to form the carrying surface 16. The frame 14 encloses a periphery of the support plate portion away from the other flap, an upper end face of the frame 14 is higher than the carrying surface 16, and the frame 14 is configured to prevent the goods on the flap from falling from an edge during the carrying process so as to improve the setting stability of the goods in the flap assembly 1. Optionally, the two frames 14 are enclosed so as to reduce a gap between the two frames 14 and prevent the goods from falling from the gap. A preset gap is provided between one end of any frame 14 and a corresponding end of the other frame 14 so as to prevent one flap from interfering with the other flap during the turning process of the flap.

In this embodiment, each frame 14 is in a C-shaped structure, and the two frames 14 are enclosed to form an elliptical edge, so that the flap assembly 1 is in an elliptical structure as a whole, has a relatively large effective support area and a beautiful appearance. However, it can be understood that a projection of the flap assembly 1 on the horizontal plane may also be circular, rectangular or other irregular shapes as long as the carrying surface 16 for the goods is sufficient, and the frame 14 of each flap may be adaptively designed according to the overall shape of the flap assembly 1, which is not limited in the present application.

Optionally, in this embodiment, the frame 14 includes a first segment 141, a second segment 142, and a third segment 143 which are sequentially connected. Second segments 142 of the two frames 14 are disposed opposite to each other, and an upper end of the second segment 142 of each frame 14 is lower than upper ends of the first segment 141 and the third segment 143. With this configuration, when each flap is turned to slide the goods into the compartment, the flap is turned in a direction away from the other flap, so that the goods on the flap slide from the second segment 142 and fall into the compartment. Therefore, the height of the upper end of the second segment 142 is reduced, which is conductive to more smoothly sliding the goods into the compartment, and prevents the goods from staying on the flap. Optionally, the frame 14 and the support plate portion are connected by using an arc for the smooth transition to reduce the resistance of the goods falling into the compartment.

Optionally, in this embodiment, a sectional view of the frame 14 is a U-shaped structure whose opening faces downward, and the frame 14 includes a top plate portion 145 forming a transverse side of the U-shaped structure, a connection portion 144 forming a vertical side of the U-shaped structure, and a edge blocking portion 146 forming another vertical side of the U-shaped structure. The connection portion 144 is located inside the edge blocking portion 146, a lower end of the connection portion 144 is connected to the support plate portion, an upper end of the connection portion 144 is connected to the top plate portion 145, an upper end of the edge blocking portion 146 is connected to the top plate portion 145, a lower end of the edge blocking portion 146 extends downward in a vertical direction, and a dimension of the edge blocking portion 146 in a height direction is larger than that of the connection portion 144 in the height direction. With this configuration, the edge blocking portion 146 is provided, so that a part of the structure of the flap driving assembly 2 is blocked, and when the pallet assembly is disposed on the cart body, since the flap assembly 1 is exposed at an upper end of the shell, the edge blocking portion 146 may be abutted with the cart body, thereby improving the overall aesthetic appearance of the sorting robot.

To improve the supporting performance of a single flap on the goods, optionally, the support plate portion of each flap includes multiple horizontally disposed support slats 13. A first end of the support slat 13 is connected to the frame 14, a second end of the support slat 13 extends in a direction away from the frame 14, and the multiple support slats 13 on the same flap are disposed side by side and spaced apart in the direction perpendicular to the extension direction of the support slat 13, and a slot is formed between two adjacent support slats 13. In the two flaps, the support slats 13 in one flap are inserted into the slots in the other flap plate, so that the support slats 13 in the two flaps are spliced together to form a horizontal carrying surface 16. With the design of such flap, it can be ensured that when the goods are carried on the carrying surface 16 of the flap, each flap has an enough contact area with the goods, so that when any flap is turned, the goods can be driven to turn together, so that the goods can smoothly fall into the corresponding compartment.

Optionally, the dimension of each support slat 13 is matched with the dimension of the corresponding slot to increase the effective support area of the support slat 13 for the goods. Optionally, a length of each support slat 13 is slightly smaller than a width of the flap assembly 1 at a position corresponding to the support slat 13, so that the goods can be simultaneously supported by the support slats 13 on both flap assemblies no matter which position of the flap assembly 1 the goods are located. Optionally, a certain gap is provided between the periphery of each support slat 13 and a slot wall of the corresponding slot so as to prevent the two plates from interfering when being turned. In this embodiment, one flap has six support slats 13, the other flap has seven support slats 13, and in other embodiments, the number of support slats 13 on each flap can be configured according to requirements.

Figure 5:
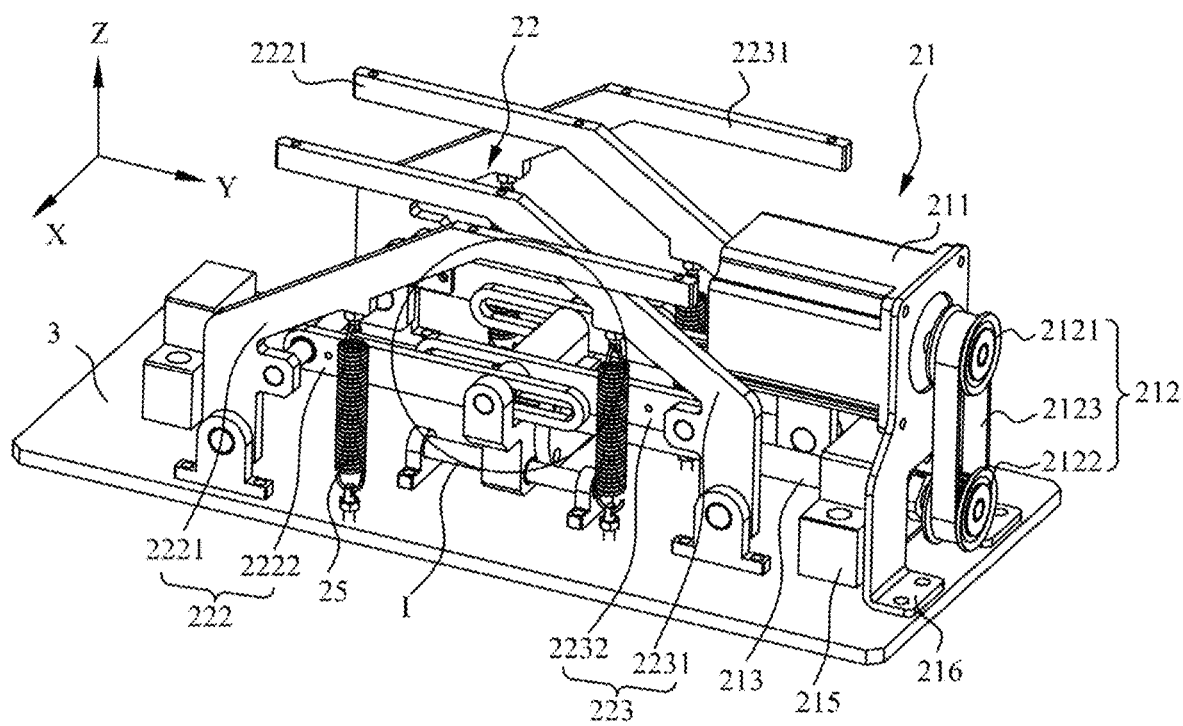
FIG. 5 is a structural diagram of the structure in FIG. 1 after removing the flap assembly from one view.
Figure 6:
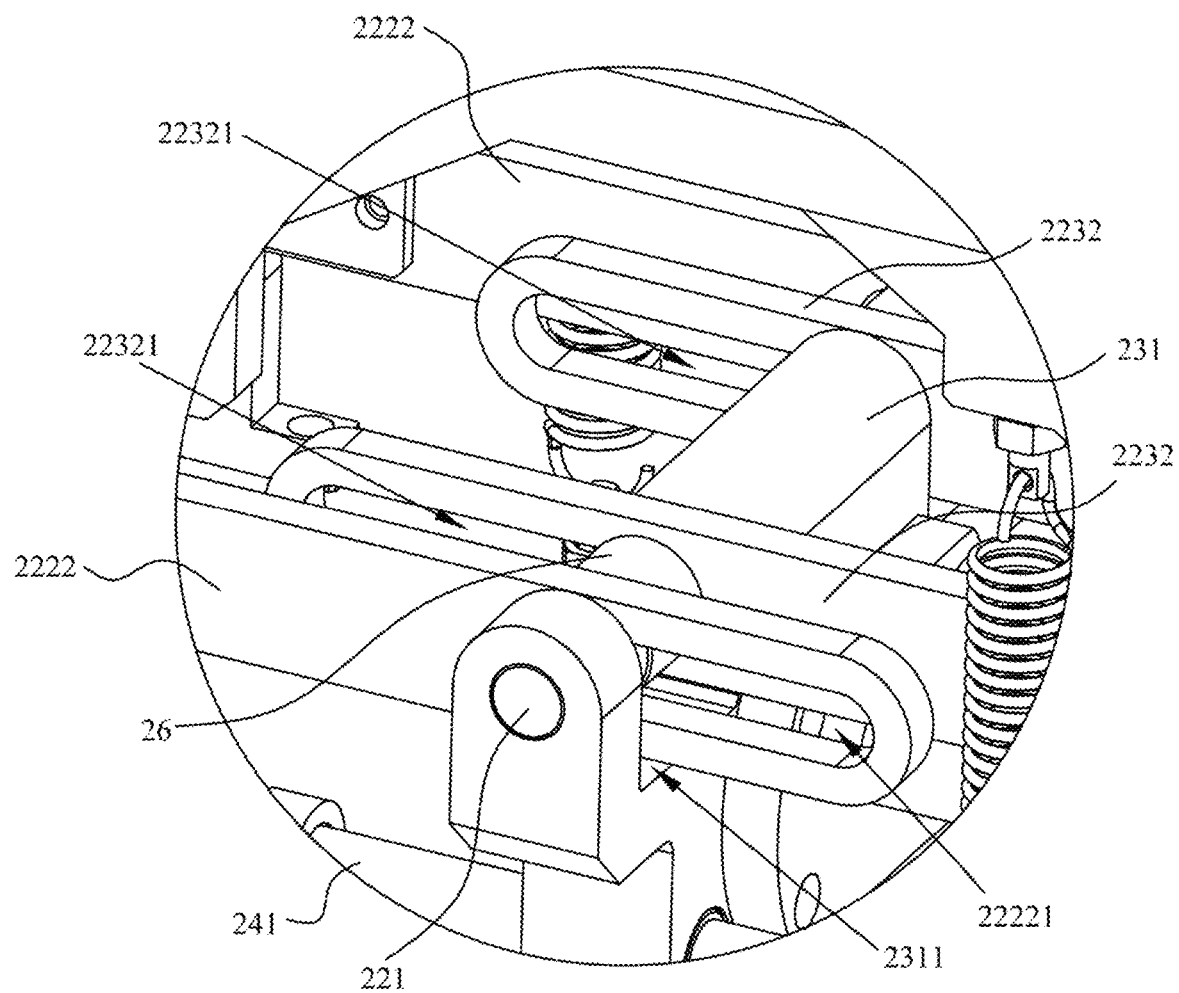
FIG. 6 is a partial enlarged view of part I in FIG. 5.
Figure 7:
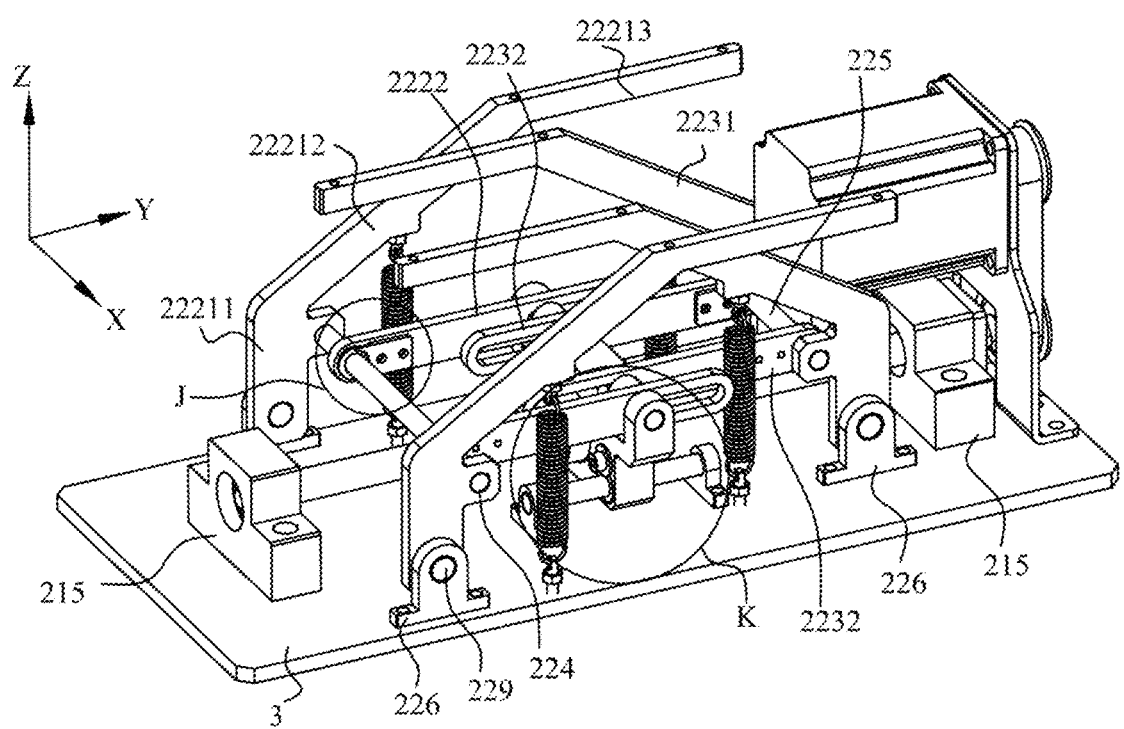
FIG. 7 is a structural diagram of the structure in FIG. 1 after removing the flap assembly from another view.
Figure 8:
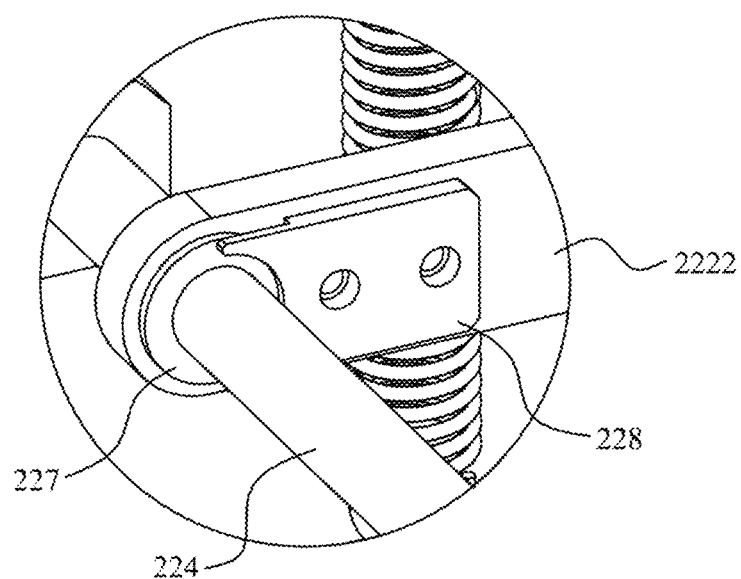
FIG. 8 is a partial enlarged view of part J in FIG. 7.
Figure 9:
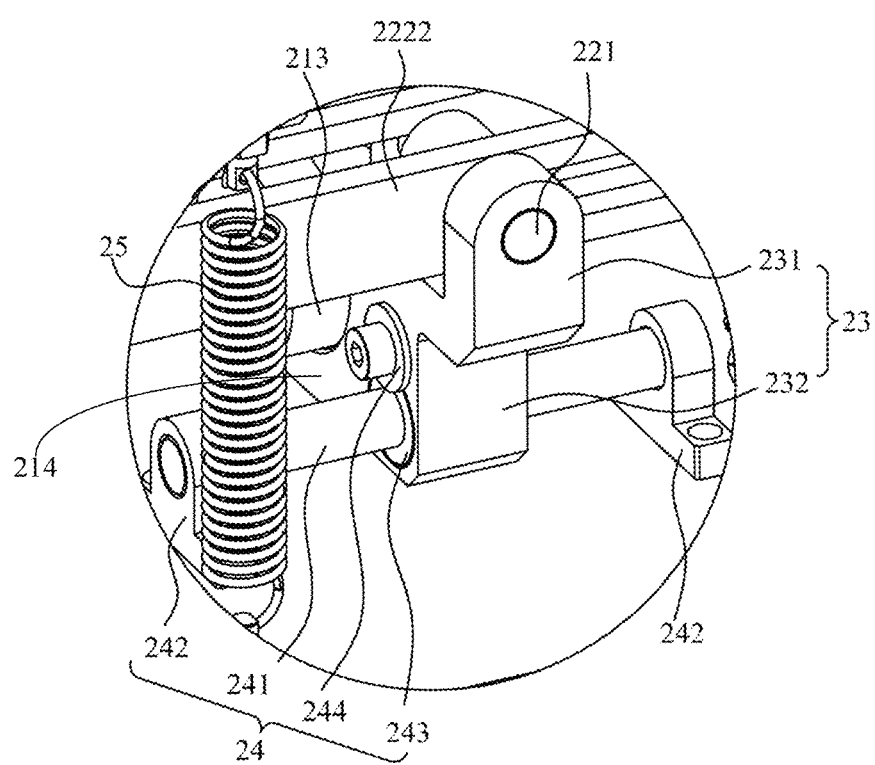
FIG. 9 is a partial enlarged view of part K in FIG. 7.

FIG. 5 is a structural diagram of the structure in FIG. 1 after removing the flap assembly from one view. FIG. 6 is a partial enlarged view of part I in FIG. 5. FIG. 7 is a structural diagram of the structure in FIG. 1 after removing the flap assembly from another view. FIG. 8 is a partial enlarged view of part J in FIG. 7. FIG. 9 is a partial enlarged view of part K in FIG. 7. As shown in FIGS. 5 to 9, the flap driving assembly 2 provided in this embodiment includes a drive unit 21 and a transmission unit 22. The transmission unit 22 includes a transmission shaft 221, a first transmission rod group 222 and a second transmission rod group 223. The transmission shaft 22 is horizontally disposed in an x direction and is connected to the drive unit 21. The first transmission rod group 222 is connected to the first flap 11 and the transmission shaft separately 221; and the second transmission rod group 223 is connected to the second flap 12 and the transmission shaft 221 separately. The drive unit 21 is configured to drive the transmission shaft 221 to reciprocate horizontally in left-right directions perpendicular to the transmission shaft 221 so as to selectively drive any one of the first transmission rod group 222 and the second transmission rod group 223 to rotate about an axis parallel to the lengthwise direction of the transmission shaft 221.

In the preceding configurations, the drive unit 21 drives the transmission shaft 221 to move and reciprocate so as to drive the first transmission rod group 222 or the second transmission rod group 223 to rotate, thereby enabling the first flap 11 connected to the first transmission rod group 222 or the second flap 12 connected to the second transmission rod group 223 to rotate, so that it is possible to control the two flaps to be selectively turned by using one drive unit 21, thereby simplifying the structure of the flap driving assembly 2 and reducing the driving cost. Moreover, it is easy to control and has a relatively low cost for using the transmission rod group to drive the corresponding flap to rotate, and the mass and the volume of the transmission unit 22 can be reduced.

Exemplarily, the first transmission rod group 222 includes a first support rod 2221 and a first connection rod 2222. A lower end of the first support rod 2221 is hinged to the base 3, an upper end of the first support rod 2221 is connected to the first flap 11, a first end of the first connection rod 2222 is connected to the transmission shaft 221, and a second end of the first connection rod 2222 extends in a direction away from the transmission shaft 221 and is hinged to the first support rod 2221. A first end of the first connection rod 2222 is provided with the first elongated hole 22221. A lengthwise direction of the first elongated hole 22221 is perpendicular to an axis direction of the transmission shaft 221, and the transmission shaft 221 passes through the first elongated hole 22221.

The second transmission rod group 223 includes a second support rod 2231 and a second connection rod 2232. A lower end of the second support rod 2231 is hinged to the base 3, an upper end of the second support rod 2231 is connected to the second flap 12, a first end of the second connection rod 2232 is connected to the transmission shaft 221, and a second end of the second connection rod 2232 extends in a direction away from the first connection rod 2222 and is hinged to the second support rod 2231. The first end of the second connection rod 2232 is provided with a second elongated hole 22321, a lengthwise direction of the second elongated hole 22321 is perpendicular to the axis direction of the transmission shaft 221, and the transmission shaft 221 passes through the second elongated hole 22321.

When the flap assembly 1 is in the first state, lengthwise directions of the first elongated hole 22221 and the second elongated hole 22321 are horizontally disposed, the transmission shaft 221 is located at a first end of the first elongated hole 22221 and a first end of the second elongated hole 22321, and a second end of the first elongated hole 22221 and a second end of the second elongated hole 22321 are respectively located at two sides of the transmission shaft 221. In this embodiment, the first end of the first elongated hole 22221 refers to an end close to a position where the first support rod 2221 is connected to the first connection rod 2222, and the first end of the second elongated hole 22321 refers to an end close to a position where the second support rod 2231 is connected to the second connection rod 2232.

The direction shown in FIG. 5 is taken as an example, when the transmission shaft 221 moves leftward from an initial position (i.e., a position when the flap assembly 1 is in the first state), since the transmission shaft 221 is located at the first end of the first elongated hole 22221, the transmission shaft 221 abuts against a left side hole wall of the first elongated hole 22221 to drive the first connection rod 2222 to move, so that the first connection rod 2222 moves leftward which causes a left end of the first connection rod 2222 to rotate counterclockwise about an axis parallel to the x direction, thereby driving the first support rod 2221 to rotate counterclockwise about a hinge axis of the base 3, that is, driving the first flap 11 to turn over in a direction away from the second flap 12. Since the transmission shaft 221 is located at the first end of the second elongated hole 22321 and the second elongated hole 22321 is horizontally disposed, the transmission shaft 221 can slide in the second elongated hole 22321 without driving the second transmission rod group 223 to move while moving leftward. Similarly, when the transmission shaft 221 moves rightward from the initial position, the second connection rod 2232 is driven to move leftward, thereby driving the second support rod 2231 to rotate clockwise, that is, the second flap 12 is turned, and at the same time, the transmission shaft 221 moves in the first elongated hole 22221. That is, the first elongated hole 22221 and the second elongated hole 22321 having horizontal initial positions are provided, when the transmission shaft 221 drives one of the flaps to turn, the operation of the other flap is not affected. Therefore, the structure is simple and the arrangement is convenient.

In this embodiment, the first elongated hole 22221 and the second elongated hole 22321 are provided to control the transmission shaft 221 to selectively drive the first transmission rod group 222 or the second transmission rod group 223, so that the structure is simple, the transmission shaft 221 can be prevented from being out of contact with the first connection rod 2222 or the second connection rod 2232 corresponding to the transmission shaft 221 during the movement, and the drive and transmission stability can be improved. In other embodiments, an end of the first connection rod 2222 and an end of the second connection rod 2232 may also be provided with limit grooves having openings toward the transmission shaft 221, and openings of the limit grooves on the first connection rod 2222 and the second connection rod 2232 are disposed opposite to each other, so that the transmission shaft 221 can also selectively drive the first connection rod 2222 and the second connection rod 2232.

In this embodiment, the first end of each of the first elongated hole 22221 and the second elongated hole 22321 is located at one end close to a position where a corresponding connection rod and a corresponding support rod are connected, so that the transmission shaft 221 horizontally operates to push the connection rod corresponding to the transmission shaft 221 to operate. With such configuration, the dimension of the flap drive assembly 2 in the Y direction is reduced while ensuring the movement itinerary of the transmission shaft 221, thereby improving the structural compactness and reducing the driving force required for the rotation of the corresponding support rod. In another embodiment, the first end of each of the first elongated hole 22221 and the second elongated hole 22321 may be located at one end away from the position where the corresponding connection rod and the corresponding support rod are connected, so that the transmission shaft 221 horizontally operates to push the corresponding connection rod to operate.

In this embodiment, each transmission rod group includes the support rod and the connection rod, which has a simple structure and strong force stability. Better turning parameters of the flap can be obtained by reasonably configuring the endpoint trajectory of the connection rod and the support rod. In other embodiments, a multi-rod structure, or a single rod structure which is Z-shaped or V-shaped may be used as long as the horizontal motion of the transmission shaft 221 can be converted into the turning motion of the corresponding flap.

In this embodiment, optionally, the first connection rod 2222 and the second connection rod 2232 have an elongated plate-like structure, and the connection rod has a lengthwise direction coinciding with the lengthwise direction of the elongated hole corresponding to the connection rod, so that the structure can be simplified and the configuration cost can be reduced. In other embodiments, the first connection rod 2222 may also be in an L-shaped or a V-shaped structure.

Referring to FIG. 7, in this embodiment, optionally, the first support rod 2221 includes a first rod portion 22211, a second rod portion 22212 and a third rod portion 22213. The first rod portion 22211, the second rod portion 22212 and the third rod portion 22213 are connected in sequence from bottom to top. When the flap assembly 1 is in the first state, the first rod portion 22211 is vertically disposed and a lower end of the first rod portion 22211 is connected to the base 3; a first end of the third rod portion 22213 is connected to an upper end of the second rod portion 22212, a second end of the third rod portion 22213 extends horizontally in a direction toward the second drive rod group 223, and the third rod portion 22213 is connected to a lower surface of the first flap 11; a lower end of the second rod portion 22212 is connected to an upper end of the first rod portion 22211, an upper end of the second rod portion 22212 is connected to the first end of the third rod portion 22213, and the second rod portion 22212 extends from bottom to top in a direction toward the transmission shaft 221, and an included angle between the second rod portion 22212 and the first connection rod 2222 is an acute angle. With this configuration, the first rod portion 22211 which is vertically disposed is provided, so that the configuration stability of the first rod portion 22211 on the base 3 can be improved, and the force stability of the flap assembly 1 can be improved when the flap assembly 1 is in the first state. The third rod portion 22213 is connected to the first flap 11 corresponding to the third rod portion 22213. The horizontal third lever portion 22213 is provided, so that the contact area between the first support rod 2221 and the first flap 11 is increased and the connection stability between the first support rod 2221 and the first flap 11 is improved. The second rod portion 22212 which is disposed obliquely is provided, so that the structural compactness of the flap driving assembly 2 is improved and the torque required for the turning of the first support rod 2221 is reduced.

Optionally, in this embodiment, the lower end of the first support rod 2221 is connected to the base 3 by a hinge base 226. The hinge base 226 includes a securing portion which is horizontally disposed, and a hinge portion which is vertically disposed, a lower end of the hinge portion is vertically connected to the securing portion. The lower end of the first support rod 2221 is provided with a first hinge shaft hole, the hinge portion is provided with a second hinge shaft hole, a hinge shaft 229 passes through the first hinge shaft hole and the second hinge shaft hole, two ends of the hinge shaft 229 protruding from the hinge portion and first support rod 2221 are provided with axial limit structures for preventing the hinge shaft 229 from the axially waggling. In other embodiments, the first support rod 2221 and the hinge base 226 may also adopt other hinge connection forms. For example, one of the first support rod 2221 and the hinge base 226 is provided with a hinge shaft hole, and the hinge shaft 229 protrudes from the other one of the first support rod 2221 and the hinge base 226, and the axial limit structure may adopt a limit structure commonly used in the related art, which will not be described in detail in this embodiment. To improve the detachability of the hinge base 226 on the base 3, the securing portion is detachably connected to the base 3 by a threaded connector.

Optionally, the structure of the second support rod 2231 is similar to the structure of the first support rod 2221, and the connection form between the second support rod 2231 and the base 3 is the same as the connection form between the first support rod 2221 and the base 3, which will not be described in detail in this embodiment.

In this embodiment, to improve the support stability and the force stability of the transmission rod group to the corresponding flap, optionally, at least two first transmission rod groups 222 and at least two second transmission rod groups 223 which are spaced apart in an axial direction (i.e., the lengthwise direction) of the transmission shaft 221 are provided on the transmission shaft 221. In this embodiment, the number of the first transmission rod groups 222 is two and the number of the second transmission rod groups 223 is two, and in other embodiments, the number of the first transmission rod groups 222 and the number of the second transmission rod groups 223 which may both be one, three or more, may be configured according to the area of the carrying surface of the flap assembly 1.

In this embodiment, two first connection rods 2222 and two second connection rods 2232 are spaced apart in the horizontal direction of the transmission shaft 221 and the two second connection rods 2232 are both located between the two first connection rods 2222. In other embodiments, the arrangement mode of the two first connection rods 2222 and the two second connection rods 2232 may be configured according to requirements.

In this embodiment, optionally, to improve the force stability and the driving smoothness of the transmission rod group, the transmission unit 22 further includes a first connection shaft 224 and a second connection shaft 225, both of the first connection shaft 224 and the second connection shaft 225 are spaced apart and parallel to the transmission shaft 221, and the first connection shaft 224 and the second connection shaft 225 are located on both sides of the transmission shaft 221 respectively. Each end of the first connection shaft 224 is connected to one of the two first support rods 2221. One end of the first connection rod 2222 away from the transmission shaft 221 is rotationally sleeved on the first connection shaft 224, and the first connection shaft 224 is vertically connected to the first support rod 2221, thereby ensuring the two first support rods 2221 to be synchronously operated and improving the turning stability and the stress balance of the first flap 11, and at the same time, preventing the distance between the two first connection rods 2222 from being too large while increasing the distance between the two first support rods 2221, shortening the overall length of the transmission shaft 221, facilitating arranging the axial limit structure on the transmission shaft 221, and improving the structural compactness.

As shown in FIG. 8, to reduce the rotational wear between the first connection rod 2222 and the first connection shaft 224, optionally, a hinge bush 227 is provided between the first connection rod 2222 and the first connection shaft 224. The first connection rod 2222 is provided with a shaft hole. The hinge bush 227 includes a cylindrical main body. Both the first connection shaft 224 and the main body pass through the shaft hole, and the main body is sleeved between the first connection shaft 224 and the first connection rod 2222. The inner diameter of the main body is equal to the outer diameter of the first connection shaft 224, and the outer diameter of the main body is equal to the aperture of the shaft hole.

The hinge bush 227 is made of a wear-resistant material, the frictional wear between the first connection rod 2222 and the first connection shaft 224 can be reduced, and the service life of the first connection rod 2222 and the first connection shaft 224 can be prolonged.

Optionally, to prevent the hinge bush 227 from being disengaged, the hinge bush 227 further includes a limit portion which is disposed coaxially with the main body, the limit portion is located at one end of the main body, the inner diameter of the limit portion is equal to the inner diameter of the main body, the outer diameter of the limit portion is larger than the outer diameter of the main body, and the limit portion is connected to the end face of the main body and abut against a surface of the first connection rod 2222. Optionally, the first connection rod 2222 is also provided with a limit plate 228. The limit plate 228 is detachably connected to the first connection rod 2222, and the limit plate 228 abuts against the end face of the limit portion away from the main body. The limit portion and the limit plate 228 are provided, so that the hinge bush 227 can be limited from axially waggling with respect to the first connection rod 2222, and the configuration stability of the hinge bush 227 on the first connection rod 2222 can be improved.

In this embodiment, optionally, the arrangement of the second connection shaft 225 may refer to the arrangement of the first connection shaft 224. The second connection shaft 225 is parallel to and spaced from the transmission shaft 221. One end of the second connection rod 2232 away from the transmission shaft 221 is rotationally sleeved on the second connection shaft 225. The second connection shaft 225 is vertically connected to the second support rod 2231. The hinge bush 227 and the limit plate 228 are also disposed between the second connection rod 2232 and the second connection shaft 225, which will not be described in detail in this embodiment. In another embodiment, only one of the first connection shaft 224 and the second connection shaft 225 may be provided. In another embodiment, the axial limit of the hinge bush 227 with respect to the connection rod corresponding to the hinge bush 227 may also in other structures, such as a limit washer or the like.

As shown in FIGS. 5, 7 and 9, in this embodiment, optionally, the drive unit 21 includes a drive motor 211, a lead screw 213, a lead nut base 214 and a guide assembly 24. The drive motor 211 is disposed on the base 3. The lead screw 213 is disposed horizontally in the Y direction and is perpendicular to the transmission shaft 221. A first end of the lead screw 213 is connected to an output shaft of the drive motor 211, and a second end of the lead screw 213 is rotationally connected to the base 3. The lead nut base 214 is sleeved on the lead screw 213 and rotationally cooperates with the lead screw 213, the lead nut base 214 is capable of moving in a lengthwise direction of the lead screw 213, and the lead nut base 214 is connected to the transmission shaft 221. The guide assembly 24 is configured to eliminate the rotation of the lead nut base 214 about the axis and ensure that the lead nut base 214 moves in the lengthwise direction of the lead screw 213. The configuration structure of the motor cooperated with the lead screw and nut mechanism has strong stability, which can improve the operation stability of the transmission shaft 221. In other embodiments, the drive unit 21 may be in other structures capable of achieve the linear motion of the transmission shaft 221, such as a linear motor, a rotary motor cooperated with a rack and pinion structure, a sprocket and chain structure and the like. The above structures are commonly used in the related art and will not be described in detail in this embodiment.

In this embodiment, the drive unit 21 further includes a sprocket and chain assembly 212 including a driving sprocket 2121 sleeved on an output shaft of the drive motor 211, a driven sprocket 2122 sleeved on a first end of the lead screw 213, and a chain 2123 wound on the driving sprocket 2121 and the driven sprocket 2122. The sprocket chain assembly 212 is provided so that a rotational speed and a torque of the lead screw 213 can be better controlled. In other embodiments, the drive motor 211 may also be connected to the lead screw 213 by a gear reduction mechanism, or the drive motor 211 may be directly connected to the lead screw 213.

In this embodiment, optionally, the driving sprocket 2121 is disposed above the driven sprocket 2122 and the chain 2123 is vertically disposed to improve the structural compactness of the flap driving assembly 2. The drive motor 211 is connected to the base 3 by a motor fixing plate 216 which is L-shaped, a horizontal edge portion of the motor fixing plate 216 is connected to the base 3, and a vertical edge portion of the motor fixing plate 216 is connected to a housing of the drive motor 211. To ensure the connection stability of the lead screw 213, both ends of the lead screw 213 are rotationally connected to the base 3 by the mounting base 215. The structure of the mounting base 215, the structure of the sprocket and chain assembly 212 and the structure of the drive motor 211 may all adopt the structures in the related art, and all the structures are conventional arrangements in the art, which will not be described in detail in this embodiment.

Optionally, to facilitate the connection between the lead nut base 214 and the transmission shaft 221, a connection base 23 is connected between the lead nut base 214 and the transmission shaft 221, and a mounting hole and a shaft connection hole are provided on the connection base 23, a center line of the mounting hole is perpendicular to an axis of the shaft connection hole, and the lead nut base 214 passes through the mounting hole and the transmission shaft 221 passes through the shaft connection hole. With this configuration, the structure of the lead nut base 214 can be simplified, so that the lead nut base 214 can be arranged in a universal structure. In other embodiments, the shaft connection hole may also be provided directly on the lead nut base 214.

Optionally, the connection base 23 is threadedly connected to the lead nut base 214. Exemplarily, one end of the lead nut base 214 is provided with a flange portion. The flange portion is located outside the mounting hole on the connection base 23 and one end surface of the flange portion abuts against the connection base 23. The connection base 23 includes a drive connection portion 232 located at the lower end and a shaft connection portion 231 located at the upper end. The drive connection portion 232 is provided with the mounting hole, and the shaft connection portion 231 is provided with the shaft connection hole. The drive connection portion 232 is connected to the flange portion by a connection member such as a bolt to facilitate the disassembly.

Optionally, an upper end face of the shaft connection portion 231 is provided with a connection groove 2311, the connection groove 2311 penetrates two opposite side walls of the shaft connection portion 231 in the lengthwise direction of the lead screw 213, each of the first connection rod 2222 and the second connection rod 2232 partially extends into the connection groove 2311, and at least one side surface of each of the first connection rod 2222 and the second connection rod 2232 abuts against a corresponding groove wall of the connection groove 2311. Such arrangement limits axial positions of the first connection rod 2222 and the second connection rod 2232 on the transmission shaft 221 by using the groove wall of the connection groove 2311 while facilitating the connection between the first connection rod 2222 and the transmission shaft 221 as well as the connection between the second connection rod 2232 and the transmission shaft 221.

In this embodiment, the shaft connection portion 231 is provided with two connection grooves 2311 in the lengthwise direction of the transmission shaft 221, one first connection rod 2222 and one second connection rod 2232 are provided in each connection groove 2311, the transmission shaft 221 is provided with a limit sleeve 26 at a position of each connection groove 2311, a first side surface of each connection rod abuts against the groove wall of the connection groove 2311 corresponding to the each connection rod, a second side surface of each connection rod abuts against a corresponding end surface of the limit sleeve 26, and the first side surface and the second side surface are two side surfaces opposite to each other, thereby achieving the axial limitation of each connection rod on the transmission shaft 221. In other embodiments, the connection groove 2311 may also be provided corresponding to each connection rod so that both side surfaces of each connection rod can only abut against the groove wall of the connection groove 2311; or the axial limitation of each connection rod on the transmission shaft 221 may be achieved by using the limit structure commonly used in other related art.

As shown in FIG. 9, in this embodiment, optionally, the guide assembly 24 includes a guide shaft 241 arranged in parallel with the lead screw 213, a guide hole is provided on the connection base 23, the guide shaft 241 passes through the guide hole, and both ends of the guide shaft 241 are supported on the base 3 by a fixing base 242. The structure of the fixing base 242 may refer to the structure of the hinge base 226, or the structure in which the shaft can be fixed on the flat plate in other related art is adopted, which will not be described in detail in this embodiment.

To alleviate the friction wear between the guide shaft 241 and the connection base 23, the guide assembly 24 further includes a guide bush 243. Exemplarily, the guide bush 243 includes a main shaft portion and a limit shaft portion disposed in the axial direction of the guide bush 243, and the outer diameter of the main shaft portion is smaller than that of the limit shaft portion. The guide hole on the connection base 23 includes a main shaft hole and a limit shaft hole disposed in the axial direction of the connection base 23, the diameter of the main shaft hole is equal to the diameter of the main shaft portion, the diameter of the limit shaft hole is equal to the outer diameter of the limit shaft portion, the limit shaft portion is disposed in the limit shaft hole, and the main shaft portion is disposed in the main shaft hole, and a step between the main shaft hole and the limit shaft hole is formed to prevent the guide shaft 241 from waggling in the axial direction toward the main shaft portion. Optionally, the guide assembly 24 also includes a limit piece 244 which is detachably connected to the connection base 23, and one side of the limit piece 244 abuts against one side of the limit shaft portion away from the main shaft portion.

In this embodiment, to make the flap assembly 1 automatically return from the second state to the first state, the pallet assembly further includes a reset assembly which is configured to make the flaps to return to the initial horizontal position after the flaps are turned. Optionally, in this embodiment, the reset assembly includes a tension spring 25, a lower end of the tension spring 25 is connected to the base 3, an upper end of the tension spring 25 is connected to the second rod portion 22212 of the support rod, and the tension spring 25 is disposed in one-to-one correspondence with the support rod. When the flap assembly is in the first state, the tension spring 25 is vertically disposed and in an original long state, when the flap is changed from a horizontal state to a flap state, the tension spring 25 is elongated; and when the flap is changed from the flap state to the horizontal state, the support rod rotates and resets under the action of an elastic restoring force of the tension spring 25, and drives the corresponding flap to reset.

In another embodiment, the tension spring 25 may also be directly disposed between the base 3 and the flap, that is, the upper end of the tension spring 25 is connected to the corresponding flap, the lower end of the tension spring 25 is connected to the base 3. When the flap is in the horizontal state, the tension spring 25 is in the original long state, and when the flap is in the flap state, the tension spring 25 is in the stretched or compressed state (which is related to a connection position of the flap).

In another embodiment, the reset assembly may also include a torsion spring, and the torsion spring is sleeved on the hinge shaft 229 of the support rod, and a first end of the torsion spring is connected to the hinge base 226, and a second end of the torsion spring is connected to the support rod, so that the support rod is rotated and reset by the elastic restoring force of the torsion spring, that is, the flap is reset after being turned.

The direction shown in FIG. 5 is taken as an example, the working process of the pallet assembly provided in this embodiment is as follows. The first flap 11 changes from the initial horizontal state to the flap state: the drive motor 211 rotates forward (or reversely) to drive the lead screw 213 to rotate, the lead nut base 214 moves leftward in the lengthwise direction of the lead screw 213 and drives the transmission shaft 221 to move leftward by the connection base 23; the transmission shaft 221 slides in the second elongated hole 22321 and drives the first connection rod 2222 to move leftward; one end of the first connection rod 2222 away from the transmission shaft 221 is turned counterclockwise to drive the first support rod 2221 to turn counterclockwise around the hinge shaft 229, thereby driving the first flap 11 to turn; and when the transmission shaft 221 is operated to a left limit position (the transmission shaft 221 is located or close to the second end of the second elongated hole 22321), the first flap 11 is turned in place, the drive motor 211 stops rotating forward, the tension spring 25 is in the stretch state, and the goods on the first flap 11 fall into the corresponding compartment.

The first flap 11 moves from the turning state to the initial horizontal state: the drive motor 211 rotates reversely (or forward) to drive the lead screw 213 to rotate, and the lead nut base 214 moves rightward in the lengthwise direction of the lead screw 213, and drives the transmission shaft 221 to move rightward by the connection base 23 until the transmission shaft 221 returns to the initial position; the transmission shaft 221 slides in the second elongated hole 22321 and the first elongated hole 22221 until the transmission shaft 221 returns to the initial position (the transmission shaft 221 is located at the first end of the first elongated hole 22221 and the first end of the second elongated hole 22321); and the first support rod 2221 is rotated clockwise about the hinge shaft 229 by the elastic restoring force of the tension spring 25, and drives the first flap 11 to turn over until the tension spring 25 returns to the original long state and the first flap 11 returns to the initial horizontal position.

The second flap 12 changes from the initial horizontal state to the turning state: the drive motor 211 rotates reversely (or forward) to drive the lead screw 213 to rotate, the lead nut base 214 moves rightward in the lengthwise direction of the lead screw 213, and drives the transmission shaft 221 to move rightward by the connection base 23; the transmission shaft 221 slides in the first elongated hole 22221 and drives the second connection rod 2232 to move rightward; a right end of the second connection rod 2232 is turned clockwise to drive the second support rod 2231 to turn clockwise about the hinge shaft 229, thereby driving the second flap 12 to turn; when the transmission shaft 221 is operated to a right limit position (the transmission shaft 221 is located or close to the second end position of the first elongated hole 22221), the second flap 12 is turned in place, the drive motor 211 stops rotating reversely, the corresponding tension spring 25 is in the stretched state, and the goods on the second flap 12 fall into the corresponding compartment.

The second flap 12 changes from the turning state to the initial horizontal state: the drive motor 211 rotates forward (or reversely) to drive the lead screw 213 to rotate, the lead nut base 214 moves leftward in the lengthwise direction of the lead screw 213, and drives the transmission shaft 221 to move leftward by the connection base 23 until the transmission shaft 221 returns to the initial position; the transmission shaft 221 slides in the second elongated hole 22321 and the first elongated hole 22221 until the transmission shaft 221 returns to the initial position (the transmission shaft 221 is located at the first end of the first elongated hole 22221 and the first end of the second elongated hole 22321); and the second support rod 2231 rotates counterclockwise about the hinge shaft 229 under the action of the elastic restoring force of the tension spring 25, and drives the second flap 12 to turn until the corresponding tension spring 25 returns to the original long state and the second flap 12 returns to the initial horizontal position.

What is claimed is:

1. A pallet assembly, comprising:
    a flap assembly comprising a first flap and a second flap, wherein the flap assembly has a first state in which the first flap- and the second flap are coplanar so as to form a carrying surface for carrying goods, and a second state in which any one of the first flap and the second flap is turned so as to make the goods slide off;
    a flap driving assembly configured to selectively drive any one of the first flap and the second flap to flap with respect to another one of the first flap and the second flap; and
    a base, wherein when the flap assembly is in the first state, the flap assembly is in parallel with and spaced apart from the base, the flap assembly is located above the base, and the flap driving assembly is disposed between the flap assembly and the base;
    wherein the flap driving assembly comprises a drive unit and a transmission unit, wherein the transmission unit comprises:
    a transmission shaft disposed horizontally;
    a first transmission rod group connected to the first flap and the transmission shaft separately; and
    a second transmission rod group connected to the second flap and the transmission shaft separately;

wherein the drive unit is configured to drive the transmission shaft to reciprocate horizontally in left-right directions perpendicular to the transmission shaft so as to selectively drive any one of the first transmission rod group and the second transmission rod group to rotate about an axis parallel to the transmission shaft.

2. The pallet assembly of claim 1, wherein the first transmission rod group is provided with a first elongated hole, the second transmission rod group is provided with a second elongated hole, and the transmission shaft passes through the first elongated hole and the second elongated hole; and when the flap assembly is in the first state, a lengthwise direction of the first elongated hole and a lengthwise direction of the second elongated hole are horizontally arranged and perpendicular to an axis of the transmission shaft, the transmission shaft is located at a first end of the first elongated hole and a first end of the second elongated hole, and a second end of the first elongated hole and a second end of the second elongated hole are respectively located at two sides of the transmission shaft.

3. The pallet assembly of claim 2, wherein the first transmission rod group comprises a first support rod and a first connection rod, a first end of the first support rod is connected to the first flap, a second end of the first support rod is hinged to the base, a first end of the first connection rod is provided with the first elongated hole, and a second end of the first connection rod extends in a direction away from the transmission shaft and is hinged to the first support rod; and wherein the second transmission rod group comprises a second support rod and a second connection rod, a first end of the second support rod is connected to the second flap, a second end of the second support rod is hinged to the base, a first end of the second connection rod is provided with the second elongated hole, and a second end of the second connection rod extends in a direction away from the first connection rod and is hinged to the second support rod.

4. The pallet assembly of claim 3, wherein the first end of the first elongated hole is located at one end of the first elongated hole close to a connection position of the first connection rod and the first support rod, and the first end of the second elongated hole is located at one end of the second elongated hole close to a connection position of the second connection rod and the second support rod.

5. The pallet assembly of claim 4, wherein the transmission unit comprises at least two first transmission rod groups and at least two second transmission rod groups, the at least two first transmission rod groups and the at least two second transmission rod groups are arranged side by side and spaced apart in a lengthwise direction of the transmission shaft.

6. The pallet assembly of claim 3, wherein the first support rod and the second support rod each comprises a first rod portion, a second rod portion and a third rod portion which are connected in sequence from bottom to top, wherein when the flap assembly is in the first state, the first rod portion is vertically arranged and a lower end of the first rod portion is connected to the base; the third rod portion is horizontally arranged and connected to the first flap corresponding to the third rod portion (22213) or the second flap corresponding to the third rod portion; and the second rod portion is obliquely arranged with respect to a horizontal direction, and an included angle between the second rod portion and a connection rod or the second connection rod corresponding to the second rod portion is an acute angle.

7. The pallet assembly of claim 6, wherein the transmission unit comprises at least two first transmission rod groups and at least two second transmission rod groups, the at least two first transmission rod groups and the at least two second transmission rod groups are arranged side by side and spaced apart in a lengthwise direction of the transmission shaft.

8. The pallet assembly of claim 3, wherein the transmission unit comprises at least two first transmission rod groups and at least two second transmission rod groups, the at least two first transmission rod groups and the at least two second transmission rod groups are arranged side by side and spaced apart in a lengthwise direction of the transmission shaft.

9. The pallet assembly of claim 8, wherein the transmission unit comprises at least one of:

a first connection shaft, wherein the first connection shaft is in parallel with and spaced apart from the transmission shaft, one end of the first connection rod away from the transmission shaft is rotationally sleeved on the first connection shaft, and the first connection shaft is vertically connected to the first support rod; and a second connection shaft, wherein the second connection shaft is in parallel with and spaced apart from the transmission shaft, one end of the second connection rod away from the transmission shaft is rotationally sleeved on the second connection shaft, and the second connection shaft is vertically connected to the second support rod.

10. The pallet assembly of claim 3, wherein the drive unit comprises:

a drive motor arranged on the base;

a lead screw arranged horizontally and perpendicular to the transmission shaft, wherein a first end of the lead screw is connected to an output shaft of the drive motor, and a second end of the lead screw is rotationally connected to the base; and a lead nut base sleeved on the lead screw and capable of moving in a lengthwise direction of the lead screw, wherein the lead nut base is connected to the transmission shaft.

11. The pallet assembly of claim 10, further comprising:

a connection base provided with a mounting hole and a shaft connection hole, a center line of the mounting hole is perpendicular to a center line of the shaft connection hole, the lead nut base is inserted in the mounting hole, and the transmission shaft passes through the shaft connection hole.

12. The pallet assembly of claim 11, wherein an upper end face of the connection base is provided with a connection groove, the connection groove penetrates two opposite side walls of the connection base in the lengthwise direction of the lead screw, each of the first connection rod and the second connection rod partially extends into the connection groove, and at least one side surface of each of the first connection rod and the second connection rod abuts against a corresponding groove wall of the connection groove.

13. The pallet assembly of claim 1, further comprising:

a reset assembly arranged to reset the first flap and the second flap to an initial horizontal position after the first flap and the second flap are turned.

14. The pallet assembly of claim 1, wherein the first flap and the second flap each comprises a frame, and a support plate portion arranged horizontally, wherein the frame encloses a periphery of the support plate portion, and when the flap assembly is in the first state, upper surfaces of support plate portions of the first flap and the second flap are coplanar so as to form the carrying surface.

15. The pallet assembly of claim 14, wherein the support plate portion comprises a plurality of support slats arranged side by side and spaced apart, wherein a slot is formed between adjacent two support slats of the plurality of support slats and when the flap assembly is in the first state, a support slat of any one of the first flap and the second flap is inserted in a slot of another one of the first flap and the second flap.

16. A sorting robot, comprising the pallet assembly of claim 1, a cart body and a control mechanism;
   wherein the cart body is configured to achieve a movement of the sorting robot, and the control mechanism is configured to control an operation of the sorting robot.

* * * * *